United States Patent [19]

Pierson et al.

[11] 4,315,056

[45] Feb. 9, 1982

[54] LOW TIN TERNE COATED STEEL ARTICLE

[75] Inventors: Marvin B. Pierson, Franklin; Frank C. Dunbar, Monroe, both of Ohio

[73] Assignee: Armco Inc., Middletown, Ohio

[21] Appl. No.: 118,073

[22] Filed: Feb. 4, 1980

Related U.S. Application Data

[63] Continuation of Ser. No. 793,624, May 4, 1977, abandoned, which is a continuation-in-part of Ser. No. 730,622, Oct. 7, 1976, abandoned, which is a continuation of Ser. No. 499,917, Jul. 22, 1974, abandoned.

[51] Int. Cl.$^3$ .................. B32B 15/04; B32B 15/18; C23C 1/06
[52] U.S. Cl. .................. 428/645; 75/166 D; 427/329; 427/349; 427/367; 427/433; 428/681
[58] Field of Search ............ 428/645, 681; 75/166 D; 427/329, 349, 367, 433

[56] References Cited

U.S. PATENT DOCUMENTS

| | | | |
|---|---|---|---|
| 1,186,217 | 6/1916 | Mark et al. .................. | 428/645 |
| 2,446,996 | 8/1948 | Bouton et al. .................. | 428/681 X |
| 2,557,764 | 6/1951 | Renkin .................. | 427/367 |
| 2,647,304 | 8/1953 | Cook et al. .................. | 428/645 |
| 2,876,132 | 3/1959 | Worden et al. .................. | 427/309 X |
| 3,314,163 | 4/1967 | Kohler .................. | 118/63 |
| 3,681,118 | 8/1972 | Ohama et al. .................. | 427/349 |
| 3,819,406 | 6/1974 | Tachimori et al. .................. | 427/433 |
| 3,932,683 | 1/1976 | Robins et al. .................. | 427/433 X |

OTHER PUBLICATIONS

Siple, J. C.-Defensive Publication-T913,003, Published Aug. 14, 1973 in 913 O.G. 392.

*Primary Examiner*—L. Dewayne Rutledge
*Assistant Examiner*—W. G. Saba
*Attorney, Agent, or Firm*—Frost & Jacobs

[57] ABSTRACT

The application discloses a method of terne coating, and a terne coated product, wherein the tin content of the terne is substantially lower than in conventional terne, without the need for other alloying elements in substitution for tin, such as zinc, antimony, silver, and phosphorus. The tin content of the terne bath is lowered below conventional percentages, to between about 2% and about 6.5% and the terne coated product, upon emerging from the coating bath, is jet finished. Such a terne coat has improved solderability and appearance with no change in pinhole frequency. Coating weight control is easier than with a terne coat having 7% or more tin in the bath.

3 Claims, No Drawings

LOW TIN TERNE COATED STEEL ARTICLE

REFERENCE TO RELATED APPLICATION

This application is a continuation of copending application Ser. No. 793,624, filed May 4, 1977, which was a continuation-in-part of copending application Ser. No. 730,622, filed Oct. 7, 1976, which was a continuation of application Ser. No. 499,917, filed July 22, 1974, all now abandoned.

BRIEF SUMMARY OF THE INVENTION

The generally accepted and published composition range for terne coating is 8% to 20% tin, with the balance commercially pure lead (ASTM A 308). The least amount of tin in a terne coating mentioned in the literature is 7%. This figure is mentioned in the expired U.S. Pat. No. 2,876,132 in the name of Worden et al. So far as known, this low percent tin has heretofore proven successful in actual practice.

According to Federal Specification QQ-T-191B, the impurity level for elements other than lead and tin is 1%. When tin became scarce during World War II about 1944, work was done on low-tin terne (about 2%) but zinc, antimony, silver, or phosphorus had to be added to the bath in order to produce a sound coating. At that time a minimum of 9% tin was required in the terne to make an acceptable hot dip coating when no tin substitution elements were added.

With the high price of tin relative to the price of lead, it has become very desirable to provide a low-tin terne, provided the qualities of the high tin terne can be maintained or enhanced.

The object of terne coating is to provide an inexpensive, corrosion resistant coating of lead on a steel base, and the percentage of the tin in the terne need only be sufficient to obtain a smooth continuous coating. Furthermore, since lead does not alloy with iron, the tin addition is necessary in order to alloy with the steel base and form a metallurgical bond between coating and base metal.

In prior terne coating procedures the coating was finished by means of exit rolls turning in an oil bath. If the tin content of the bath was below about 9%, the exit rolls, normally coated with molten metal, would de-net and imprint the finished product. This would cause rejection and scrap. This is presumably the reason for the lack of success of the Worden coating.

Recently jet nozzles have come into use in the finishing of zinc and aluminum coatings on steel strip, as well as terne coating. By the use of jet nozzles in the finishing of terne coated steel, much lower tin levels have become possible, since the high tin levels needed to keep the exit rolls wetted are no longer needed.

Thus, with the tin content down to between about 2% and about 6.5% with the balance lead, and normally present impurities in an amount less than 1%, and using jet finishing rather than the conventional exit rolls, it is possible to produce a low tin terne coating having improved solderability with no change in pinhole frequency, and improved appearance, and with greater ease of coating weight control.

DETAILED DESCRIPTION

As mentioned above, a lead coating on steel is useful for many purposes. Terne coated sheets are extensively used in the manufacture of gasoline tanks, for the tractor, truck, automotive and marine industries. They are also used in radiator parts, mufflers, oil pans, and air cleaners in those industries. Terne coated steel also finds uses in such areas as roofing, hand fire extinguishers, electronic chassis and burial caskets.

The basic problem with putting a lead coating onto a steel base is that the lead does not alloy with iron. It is therefore necessary to add an ingredient which will alloy with iron and cause the lead coating to wet and bond metallurgically to the steel base. Long ago it was found that a very suitable alloying ingredient was tin which alloys readily with the steel base and forms a solid solution with the lead. This lead-tin coating alloy became known as terne coating.

In order to obtain a good finished appearance, the terne coated steel was caused to emerge from the coating bath through a pair of exit rolls turning in an oil bath which was maintained on top of the molten terne metal. It was further necessary that the exit rolls not de-wet; if they de-wetted, they would imprint the molten terne coating and thus cause rejections. De-wetting of the exit rolls was found to occur frequently when the tin content was below about 9%.

Various attempts have been made over the years to provide a low-tin terne coating but it was always found necessary to add other elements such as zinc, antimony, silver, or phosphorus or combinations of these in order to obtain a reasonably satisfactory and saleable product.

Jet finishing has recently come into use with zinc coating. The jet finishing process and apparatus is described in detail in U.S. Pat. No. 3,314,163 in the name of Kohler. By applying the jet finishing procedures to the terne coating process, it is possible to greatly reduce the tin content of the terne coat down to between about 2% and about 6.5% with the balance lead, and impurities normally present in an amount less than 1%, with a consequent reduction in cost, and while maintaining, and even enhancing the qualities of the terne coating.

In the practice of the present invention strip is preannealed forming a blue oxide surface. Surface preparation of the base metal may be more or less standard. By way of example, it may include the usual steps of pickling, scrubbing, prefluxing and bath entry through a flux cover. Preferably the pickling solution will contain from about 8% to about 15% sulfuric acid and from about 4% to about 15% ferrous sulfate. Sodium chlorate may be added as a pickle accelerator. The temperature of the pickling bath is generally from about 85° C. to about 100° C. The pickling step removes the surface oxides resulting from prior annealing. Pickling may also be accomplished in a hydrochloric acid bath. It will be understood that the preflux and flux steps may be combined in a single flux treatment.

After pickling, the picker smudge may be removed by brushing in a water rinse. Prefluxing may be accomplished by a high speed tinning flux such as is manufactured by duPont, maintained at between about 7° and about 15° Baumé, and agitated and suspended in the solution by air or steam. The preflux acids aid in removing iron salts and acid radicals from the strip surface. A commercially available bath cover such as duPont's ZACLON A galvanizing flux may be used. This is a molten zinc chloride flux with ammonium bromide or ammonium chloride dissolved in it. This would be added to a flux box which immediately precedes the terne pot.

The more or less conventional terne coating bath had the following analysis:

Antimony: 0.5 to 9%
Aluminum: 0.005% Max.
Arsenic: 0.02% Max.
Bismuth: 0.10% Max.
Copper: 0.05% Max.
Iron: 0.02% Max.
Silver: 0.05% Max.
Zinc: 0.01% Max
Tin: 12% - 15%
Total Others: 0.1% Max.
Lead: Balance Only tin is purposely added. Other elements are impurities. Relatively large amounts of antimony for example result from the reclamation of storage battery lead for terne use and is neither a hindrance nor a significant help in terne coating.

According to the present invention, the tin content of the terne coating bath may be as low as between about 2% and about 6.5% and other alloying ingredients may be eliminated. The lead and impurity content will therefore be as high as between about 98% and about 93.5%. While the range for tin content between about 2% and about 6.5% is acceptable, a preferred range is from about 2% to about 6%, and the optimum range from all standpoints appears to be between about 2% and about 5% tin. The terne coated metal emerging from the coating bath is subjected to jet finishing as taught in Kohler U.S. Pat. No. 3,314,163. The jet finishing apparatus will not be described since it does not per se form a part of the present invention; and reference may be had to said patent for detailed description thereof.

The terne coated steel according to the present invention has improved solderability over the conventional higher tin terne coating, and an improved appearance because a smoother coating is produced by jet finishing and the coating can be more easily burnished to a uniform sheen. Furthermore, the cost is reduced with reference to the conventional terne coating. The pinhole frequency remains unchanged. As far as coating weight is concerned, control is easier than with the high tin terne bath; and it is possible to produce, with much greater ease, very light coating weights such as 0.05 oz/ft.$^2$, (15.2g/m$^2$) as against 0.18 oz/ft.$^2$(54.9g/m$^2$) which was about the lightest which could be produced consistently heretofore.

It should be understood that with a reduction in tin content, the temperature of the coating bath must be increased slightly. This additional cost is nominal, and is far more than compensated for by the savings in tin.

Minor modifications may of course be made without departing from the spirit of the invention; and therefore no limitation except as set forth in the claims is intended, and no such limitation should be implied.

The embodiments of the invention in which an exclusive property or privilege is claimed are defined as follows:

1. A jet finished, hot dipped, terne coated, steel article having improved solderability and appearance, the coating consisting of about 2% tin to about 6.5% tin and the balance lead, with no other purposeful additions, and including only impurities normally present, in an amount less than 1%, the weight of the coating being from about 0.5 oz/ft.$^2$(15.2g/m$^2$), through the entire range of commercial coating weights and being the only metallic coating on said article.

2. A terne coated steel article according to claim 1 wherein the coating consists of from about 2% tin to about 6% tin and the balance lead, with no other purposeful additions, and including only impurities normally present, in an amount less than 1%.

3. A terne coated steel article according to claim 1 wherein the coating consists of from about 2% tin to about 5% tin and the balance lead, with no other purposeful additions, and including only impurities normally present, in an amount less than 1%.

* * * * *